May 19, 1970 — C. B. PRICE ET AL — 3,512,631
BLADE INSERTER SHEATH FOR ELECTRIC KNIFE
Filed Dec. 31, 1968

INVENTORS.
Samuel Braun
Charles B. Price
BY Dallett Hoopes
ATTORNEY.

3,512,631
BLADE INSERTER SHEATH FOR ELECTRIC KNIFE
Charles B. Price, Stamford, Conn., and Samuel Braun, Rye, N.Y., assignors to Scovill Manufacturing Company, Waterbury, Conn., a corporation of Connecticut
Filed Dec. 31, 1968, Ser. No. 788,288
Int. Cl. B65d 85/54; B26b 29/02
U.S. Cl. 206—16                                                2 Claims

ABSTRACT OF THE DISCLOSURE

A blade inserter sheath comprises three integrally molded hinged panels adapted to wrap around the blade and snap shut. An end extension on two of the panels hooks over a drip guard on the blade to prevent its lengthwise movement out of the sheath.

---

This invention relates to a blade inserter sheath for the compound blade of an electric carving knife. More specifically, the invention relates to a sheath adapted to hold together and protect the compound blade in storage. It is also to be used as a safety device while the blade is being inserted into the knife handle.

For electric knives in the past, compound blades, such as those shown in the Christensen Pat. No. 3,307,259, have been normally stored loose in the kitchen utensil drawer and have been handled bare without protective means during insertion into the knife handle. The absence of a convenient sheath or holder for such a blade in storage has often resulted in the inadvertent disassembly of the blade into its two separate components with the subsequent need to reassemble it, a bothersome procedure. In addition, the unguarded blade in storage and as it is manipulated in insertion into the handle has been a health hazard and has caused cuts to the operator and others.

Under the present invention, a convenient sheath for such a compound blade is presented. The sheath of the invention is useful for holding the blade together during storage and during insertion into the handle. It protects the operator against injury by the bare knife blade and it protects and keeps the blade clean.

At the same time, the sheath of the invention is of simple and durable construction and is easy to open and close, and wash.

Other objects of the invention will be apparent from a reading of the following specification including the drawings wherein.

Figures 1, 2, 3, 4:
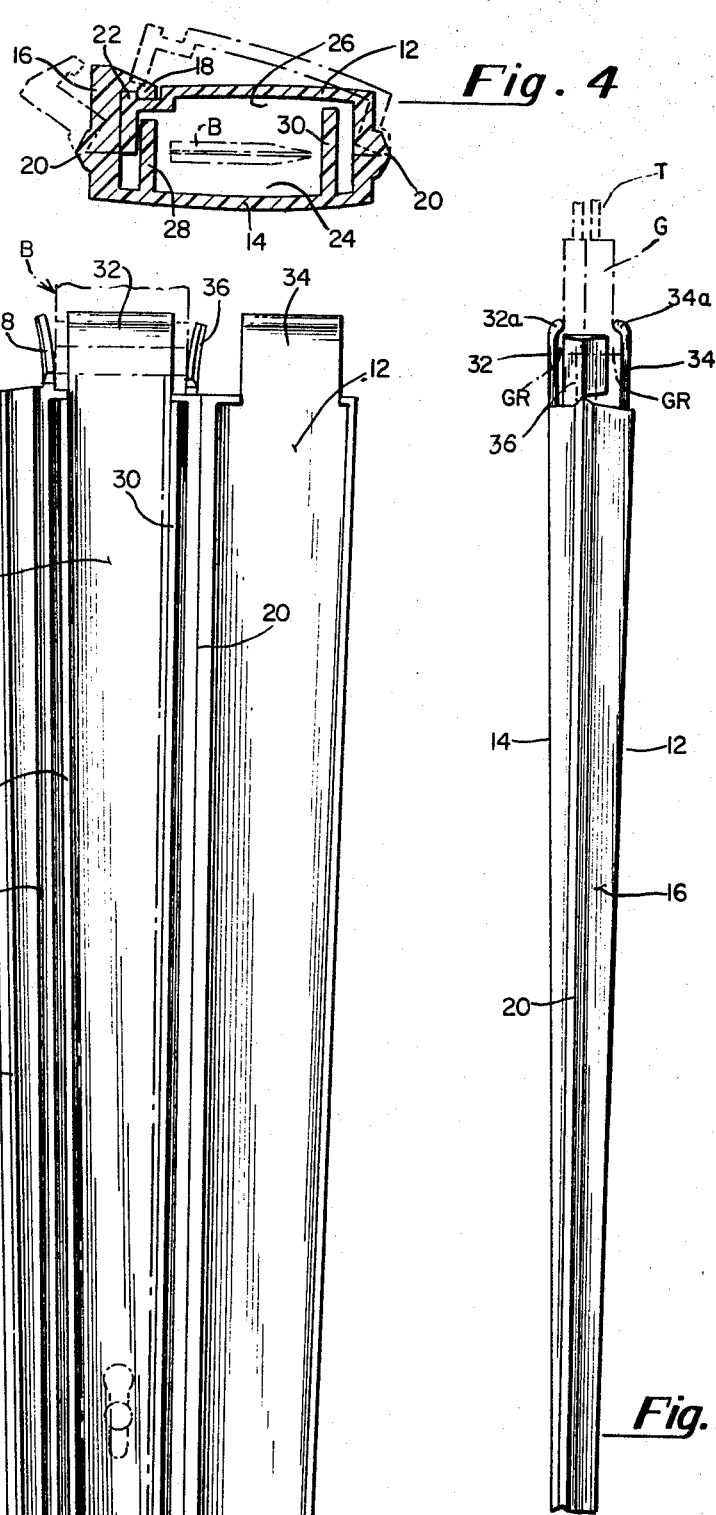
FIG. 1 is a side elevational view of a sheath embodying the invention in closed disposition.
FIG. 2 is an end view of a sheath embodying the invention.
FIG. 3 is a side view of a sheath in open disposition.
FIG. 4 is a sectional view taken on line 4—4 of FIG. 1 showing the sheath latched in full line and unlatched in phantom.

In the various figures, a compound knife blade is also shown in phantom.

Referring more specifically to the drawings, a sheath embodying the invention is generally designated 10 in FIG. 1. As shown in FIG. 2, it is an integrally molded elongated section of plastic. Preferably, the plastic is polypropylene.

The sheath includes three panels; a distal panel 12, an intermediate panel 14, and a latching panel 16 having a latching edge 18. As shown, the three panels are formed with living hinges 20 of plastic intermediate the adjacent panels so that the panels may be closed to a condition as shown in FIG. 4 surrounding the blade B. The outside edge of the panel 12 is formed with a projection 22 therealong which is engaged over by the latching edge 18 of panel 16 to hold the sheath closed.

As shown in FIG. 4, the intermediate panel 14 and the distal panel 12 are formed with lengthwise depressions 24 and 26 respectively to allow ample room for the blade. The intermediate panel 14 is formed with upward flanges 28 and 30 therealong on opposite sides of its depression 24 to position the blade B in the sheath, keeping the blade away from the hinges to avoid interference in closing.

Referring to FIG. 2, the intermediate and distal panels have integral relatively flexible endwise extensions 32 and 34 respectively. The end edges of these extensions turn in to comprise hook means 32a and 34a respectively. The blade B as shown is provided with a grease drip guard G on each of its two sections. The guard has outward rib means GR as shown (FIG. 2). In the insertion of the blade home into the closed sheath, the ribs GR cause the spread of the extensions 32 and 34 to receive the ribs after which the extensions snap closed, holding the guard by the hook means 32a and 34a, so that the blade cannot slide lengthwise out of the sheath.

Referring to FIG. 3, curved ears 36 and 38 are disposed on either side of the intermediate panel to guide the blade into the sheath opening.

It should be understood that the sheath is normally in the closed condition shown in FIG. 4 and the blade, after being washed, is inserted endwise in the sheath opening and thus can be kept in storage. To prepare the knife for use, the sheath containing the blade is held and the exposed tangs T of the knife are guided into the knife handle (not shown). Once the tangs T engage in the handle, the sheath is slipped off the blade. The sheath may be opened for washing by simply snapping off the latching edge 18 from the projection 22.

The scope of the invention is defined by the following claim language.

We claim:

1. A blade inserter sheath for the compound blade of an electric carving knife, the blade having adjacent the tang end a drip guard with outward rib means on at least one side of the blade, the sheath comprising an integrally molded elongated section of plastic including three hinged-together panels: a distal panel, an intermediate panel and a latching panel with a latching edge, the distal panel having projection means along the outside edge thereof to cooperate with the latching edge of the latching panel in holding the sheath in closed disposition about such blade, at least one of said panels having a relatively flexible endwise extension with hook means adapted to releasably engage over the rib means of such blade in holding the sheath against lengthwise displacement of such blade.

2. A sheath as described in claim 1 wherein each of said intermediate and distal panels is formed with a lengthwise depression to receive the blade and said intermediate panel is formed with an upward flange therealong on opposite sides of its depression to position such blade in the sheath.

References Cited

UNITED STATES PATENTS

| 2,528,059 | 10/1950 | Kendrick | 30—151 |
| 3,107,783 | 10/1963 | Corey et al. | 206—62 |
| 3,130,834 | 4/1964 | Korzaan | 206—80 |
| 3,307,259 | 3/1967 | Christensen | 30—272 |
| 3,317,076 | 5/1967 | Enders | 220—31 |

JOSEPH R. LECLAIR, Primary Examiner

S. E. LIPMAN, Assistant Examiner

U.S. Cl. X.R.

30—151; 220—31; 224—2.4